Feb. 27, 1934.                J. VAN DYKE                1,949,092
                    VALVE ROD GUIDE FOR FLUSH TANKS
                         Filed June 4, 1931
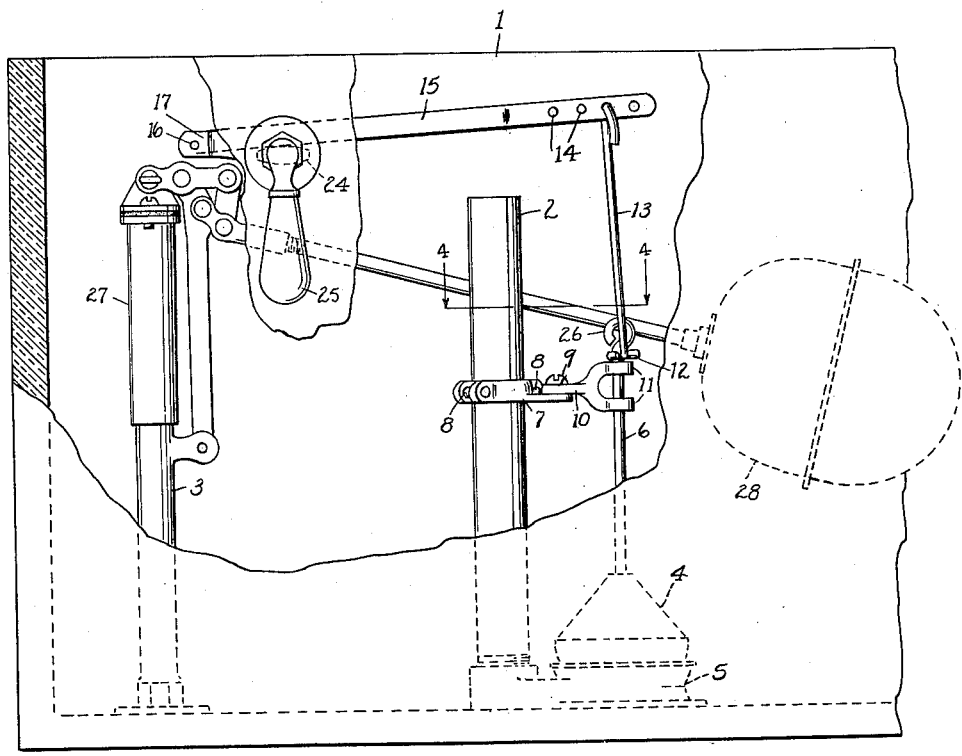
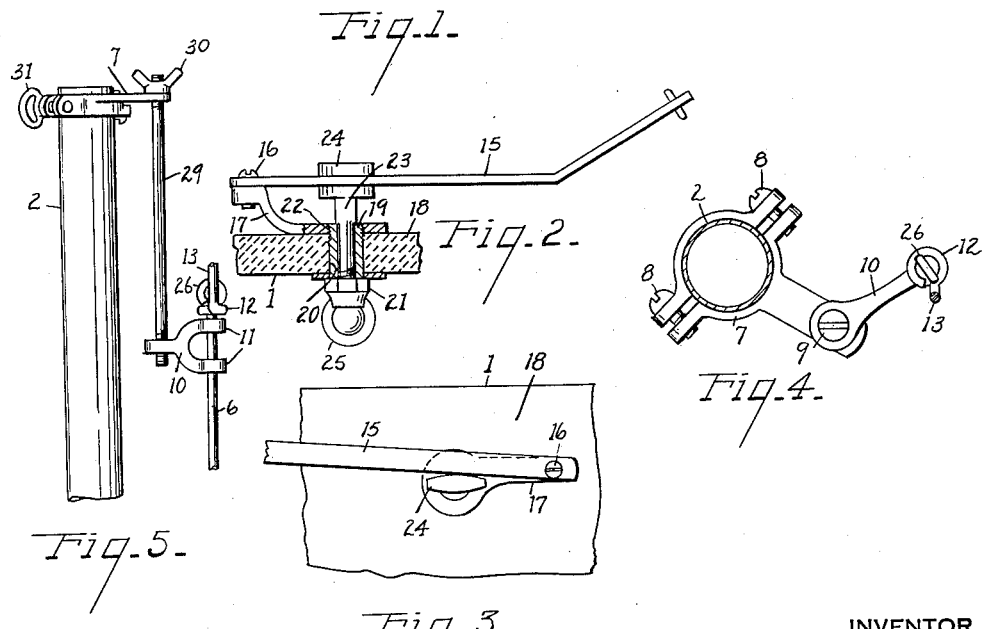
INVENTOR
John VanDyke
BY
Chappell T Earl
ATTORNEYS Patented Feb. 27, 1934

1,949,092

UNITED STATES PATENT OFFICE 1,949,092

VALVE ROD GUIDE FOR FLUSH TANKS

John Van Dyke, Kalamazoo, Mich.

Application June 4, 1931. Serial No. 542,143

3 Claims. (Cl. 4—67)

The main objects of this invention are to provide means for changing the effective length and vertical position of the ball valve lifting rod bracket guide of a flushing device and to provide improved tripping means for the ball valve tripping lever thereof.

Another object of the invention is to increase the usefulness and practicalness of devices of this type.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary view partially in side elevation and partially in cross section of a flushing device embodying my invention.

Fig. 2 is a fragmentary horizontal sectional view, partially in plan, of the tripping mechanism.

Fig. 3 is a fragmentary view in side elevation of the tripping mechanism.

Fig. 4 is a cross sectional view taken on the line 4—4 of Fig. 1, and

Fig. 5 is a fragmentary view in side elevation of another modification of the lifting rod guide assembly.

Referring to the drawing, the flushing tank 1 has an overflow pipe 2 and a supply pipe 3 of the conventional type. A ball valve 4 having a seat 5 lets water out of the tank in the usual way when unseated by a lifting rod 6. The lifting rod 6 is kept in alignment with the seat 5 by a guide comprising a bracket 7 of two parts clamped around the overflow pipe 2 by screws 8.

Pivoted to the end of the bracket 7 by screw 9 is a forked arm 10, the forks 11 of which are provided with aligned holes through which the rod or valve stem 6 loosely extends. The position of the guide may be changed relative to the overflow pipe by loosening the screw 9 and/or the screws 8, and then fixed in such changed position by tightening said screw or screws. The bracket may be adjusted vertically and also rotatably on the pipe 2.

The upper end of the stem 6 is bent to form an eye 26 that is larger than a horizontal eye 12 at the bottom of a link 13 through which the stem 6 loosely extends, so that when the link is raised the valve is also raised thereby.

The top of the link 13 has a hook formed thereon which is adapted to pass through any desired one of a plurality of spaced openings 14 provided for such purpose at the outer end of a tripping lever 15.

The lever 15 is pivoted on a screw 16 carried by a tripping lever bracket 17 that is secured in place adjacent the wall 18 of the tank 1 by a bushing 19. The bushing 19 is disposed in a suitable hole 20 in the wall 18 and has one end provided with a tool engaging head 21 and the other end threaded for engaging registering threads in an opening 22 in the bracket 17.

A shaft or spindle 23 is loosely journaled in the opening in the bushing 19. On the inner end of the spindle 23 is a double lobed cam member 24 which is disposed under and supports the lever 15. The lobes of the cam are opposite. A handle 25 of the conventional type is mounted on the outer end of the spindle 23 for turning the cam 24 under the lever 15 to elevate the latter. The handle may be turned in either direction to flush the device, the cam 24 lifting the lever 15 when the handle is turned.

The lever 15 lifts the link 13, which in turn unseats the ball valve 4. When the handle 25 is released, the weight of the mechanism turns the cam 24 to its flat position under the lever 15 and the ball valve 4 returns to its seat 5.

The inlet or supply pipe 3 has a valve 27 of the usual type that is opened and closed by the movement of a float 28 which is controlled by the amount of water in the tank 1 as is well understood in the art to which the invention relates.

In the embodiment shown in Fig. 5, the bracket 7 carries a depending rod 29 which in turn supports the forked arm 10. The effective length of the rod 29 is made adjustable by opposed threads on its ends, so that when the rod is turned the arm 10 may be raised or lowered. A wing-nut 30 is used for locking the rod in position. The bracket is clamped by wing screws 31 for convenience of adjustment.

With either embodiment illustrated, the guide for the valve may be quickly and accurately adjusted to the valve stem so that it is guided and supported centrally of the valve permitting effective sealing thereof.

While I have illustrated preferred embodiments of my invention, it is to be understood that the same may be changed in details without departing from the spirit of the invention which is limited only by the scope of the following claims.

Having thus described my invention, what I claim as new and desire to secure by Letters Patent is:

1. The combination with an overflow pipe, a ball valve having a lifting rod, and means for tripping said valve, of a guide for said rod comprising a bracket secured to said overflow pipe, a connecting rod carried by said bracket, means for changing the effective length of said rod, and an arm carried by said connecting rod and having a hole through which said lifting rod loosely extends.

2. The combination with an overflow pipe, a ball valve having a lifting rod, of a guide for said rod comprising a bracket secured to said overflow pipe, a connecting rod carried by said bracket, and an arm carried by said connecting rod and having a hole through which said lifting rod loosely extends.

3. The combination with a support, a ball valve having a lifting rod, of a guide for said rod comprising a bracket secured to said support for rotational adjustment, a vertical connecting member carried by said bracket, and an arm pivoted to said connecting member for swinging adjustment in a horizontal plane and having a hole through which said lifting rod loosely extends.

JOHN VAN DYKE.